US011798517B2

(12) United States Patent
Chrapek et al.

(10) Patent No.: US 11,798,517 B2
(45) Date of Patent: Oct. 24, 2023

(54) METHOD AND SYSTEM FOR SPAWNING ATTENTION POINTERS (APT) FOR DRAWING ATTENTION OF AN USER IN A VIRTUAL SCREEN DISPLAY WITH AUGMENTED AND VIRTUAL REALITY

(71) Applicant: Honeywell International Inc., Charlotte, NC (US)

(72) Inventors: David Chrapek, Brno (CZ); Dominik Kadlcek, Brno (CZ); Michal Kosik, Dolny Kubin (SK); Sergij Cernicko, Brno (CZ); Marketa Szydlowska, Brno (CZ); Katerina Chmelarova, Hradee Kralove (CZ)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/182,786

(22) Filed: Mar. 13, 2023

(65) Prior Publication Data

US 2023/0222994 A1    Jul. 13, 2023

Related U.S. Application Data

(63) Continuation of application No. 17/447,758, filed on Sep. 15, 2021, now Pat. No. 11,626,088, which is a
(Continued)

(51) Int. Cl.
*G09G 5/377* (2006.01)
*G06T 19/00* (2011.01)

(52) U.S. Cl.
CPC ........... *G09G 5/377* (2013.01); *G06T 19/006* (2013.01); *G09G 2340/12* (2013.01); *G09G 2354/00* (2013.01)

(58) Field of Classification Search
CPC ............ G06T 19/006; G02B 2027/014; G09G 2340/12; G09G 2354/00; G09G 5/377;
(Continued)

(56) References Cited

U.S. PATENT DOCUMENTS 9,081,177 B2    7/2015  Wong et al.
9,269,239 B1    2/2016  Jensen et al.
(Continued)

OTHER PUBLICATIONS

Extended European Search Report dated Oct. 6, 2020 in European Application No. 20177621.8 (11 pages).

*Primary Examiner* — Jacinta M Crawford
(74) *Attorney, Agent, or Firm* — Bookoff McAndrews, PLLC

(57) ABSTRACT

A method and system for generating attention pointers, including: displaying, in a display of a mobile device, an object within and outside a field of view (FOV) of an user wherein the object outside the FOV are real objects; monitoring, by a processor of the mobile device, for a change in the object within and outside the FOV; in response to a change, generating by the processor one or more attention pointers within the FOV of the user for directing user attention to the change in the object which is either inside or outside the FOV; and displaying, by the processor, on a virtual screen within the FOV to the user, the one or more attention pointers wherein the one or more attention pointers are dynamically configured to interact with the user in response to detections based on a movement of the user or the object within or outside the FOV of the user.

20 Claims, 9 Drawing Sheets

Related U.S. Application Data continuation of application No. 16/434,002, filed on Jun. 6, 2019, now Pat. No. 11,151,967.

(58) Field of Classification Search
CPC .......... G06F 3/011; G06F 3/012; G06F 3/013; G06F 3/0346; G06F 3/04815; G06F 3/0482
USPC ........................................................ 345/633
See application file for complete search history.

(56) References Cited

U.S. PATENT DOCUMENTS

| | | |
|---|---|---|
| 10,037,084 B2 | 7/2018 | Joo |
| 2014/0375683 A1 | 12/2014 | Salter et al. |
| 2015/0243079 A1 | 8/2015 | Cho et al. |
| 2016/0098860 A1 | 4/2016 | Basra |
| 2017/0076497 A1 | 3/2017 | Inomata |
| 2017/0178410 A1 | 6/2017 | Sugden et al. |
| 2017/0309079 A1 | 10/2017 | Naples et al. |
| 2017/0354883 A1 | 12/2017 | Benedetto et al. |
| 2018/0356885 A1 | 12/2018 | Ross et al. |
| 2019/0385371 A1 | 12/2019 | Joyce et al. |

METHOD AND SYSTEM FOR SPAWNING ATTENTION POINTERS (APT) FOR DRAWING ATTENTION OF AN USER IN A VIRTUAL SCREEN DISPLAY WITH AUGMENTED AND VIRTUAL REALITY

CROSS-REFERENCE TO RELATED APPLICATION(S)

This patent application is a continuation of and claims the benefit of priority to U.S. application Ser. No. 17/447,758, filed on Sep. 15, 2021, which is a continuation of and claims the benefit of priority to U.S. application Ser. No. 16/434,002, filed on Jun. 6, 2019, now U.S. Pat. No. 11,151,967, the entireties of which are incorporated herein by reference.

TECHNICAL FIELD

Embodiments of the subject matter described herein relate to an immersive viewing experience in a mobile computer device with a display or the like, and more particularly, embodiments of the subject matter relate to a method and system for spawning attention pointers for real and virtual objects and things, either within and outside a field of view (FOV) of an user, on virtual screens that are encompassed in the FOV of the user for drawing user attention to content and changes related to the real and virtual objects and things.

BACKGROUND

With the growing acceptance of Augmented Reality (AR) and Virtual Reality (VR) ("AR/VR") systems, the AR/VR systems are currently being deployed in a number of different industries, and being implemented in multi-facet ways via AR/VR apps for applications in aerospace, automotive, logistics etc. These AR/VR apps can be used by users who are equipped with smart glasses that enable a display of user content to assist the user in performing a task, service or job function. The mobile augmented reality systems combined with features such as gaze detection and foveate rendering has the potential to revolutionize the manner in which content is displayed and interacted with by users in performance of certain activities. This is because the virtual content can be directly integrated with surroundings, actual objects and conditions in the real world and provide guidance to the mobile user, who can interact with corresponding or related content displayed in a AR/VR environment; to pose and to resolve queries, and to collaborate with other users. The augmented view of the user's surroundings presents an interface to context-dependent operations, many of which are related to the actual objects in view via user interfaces putting forth virtual objects for guidance and performing tasks in the real world by users. Further, these users with smart glasses reap benefits from various information showed in the AR/VR domain that would otherwise require manual look up on their part and this saves time and helps them perform the job or task required right way.

However, unlike PC or tablets, the smart glasses still provide smaller displaying capability in terms of amount of information that are comfortably visible at once. The information in AR or VR virtual screens is positioned all around the user and in his/her surroundings so that the user can look for more information. With the plethora of content displayed about the user in AR/VR, the user often is not aware of changes in content and content updates because the changes and updates can be outside the field of view of the user or may not either not be currently visible or the user does not notice a content change. In an immersive viewing experience with smart glasses, changes can occur that are outside the field of view of the user that the user may be only peripherally at best aware of. In such cases, the user may not turn his head or body to encompass the change in his/her field of view and this can lead to important pieces of information missed.

The result of this missing content can lead to improper actions taken by a user in task performance because the user as a result does not have a full picture of the current situation. The missing of content by the user can lead to mistakes (even in minute amounts) that can delay or cause improper user's decisions in a task performance. This often results because the user attention is fully focused on the job at hand and not on the content displayed that results in information presented being missed due to this lack of attention. Moreover, the missed information may occur even when the content is displayed right in front of user in a current display screen. Also, other chain related issues are raised when content is missed that cause confusion, loss of situational awareness, delayed decision or improper actions taken which can accentuate an initial wrong situation caused by information missed from the inadvertent user lack of attention.

Accordingly, it is desirable to provide a method and system that creates a set of attention pointers in a field of view of an user that dynamically draws the user attention to content and content changes on virtual screens that encompass the user's field of view to content outside the user's field of view by spawning attention pointers within the field of view (FOV) to elements of real objects, virtual objects and images outside the FOV.

Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method and system to augment, virtualize, or present real and virtual objects with ATPs, where the ATPs are presented to draw or direct user attention to content including elements of real and virtual objects, and content changes displayed in the virtual screens. In various instances, the ATPs can provide guidance such as in the performance of task in an user's job or to an user viewing objects of interest by using the ATPs to direct or draw the attention of the user to content changes.

In one exemplary embodiment, a method for generating attention pointers, is provided. The method includes: displaying, in a display of a mobile device, an object within and outside a field of view (FOV) of an user wherein the object outside the FOV are real objects; monitoring, by a processor of the mobile device, for a change in the object within and outside the FOV; in response to a change, generating by the processor one or more attention pointers within the FOV of the user for directing user attention to the change in the object which is either inside or outside the FOV; and displaying, by the processor, on a virtual screen within the FOV to the user, the one or more attention pointers wherein the one or more attention pointers are dynamically configured to interact with the user in response to detections based on a movement of the user or the object within or outside the FOV of the user.

In various exemplary embodiments, the method includes: identifying, by the processor, an object inside or outside the FOV by generating an attention pointer configured as a highlight about the object. The method further includes: generating, by the processor, an attention pointer as a highlight about the object that dynamically changes as the object moves into the FOV of the user; and removing the attention pointer of the highlight of the object once the object is within the FOV. The method further includes: generating, by the processor, an attention pointer as a highlight of a border of a virtual screen when the virtual is screen is outside or outside in part of the FOV of the user that dynamically changes as the virtual screen moves into the FOV of the user; and removing, by the processor, the attention pointer of the highlight of the border of the virtual screen once the virtual screen is within the FOV of the user. The method, further includes: re-configuring, by the processor, the one or more attention pointers by size, shape, and image for drawing user attention to the object. The method, further includes: updating, by the processor, one or more virtual screens within or outside the FOV of the user, by the user selecting an update button. The method, further includes: generating, by the processor, an attention pointer of a highlight of a real object as the object moves from outside to inside the FOV of the user. The method, further includes: configuring, by the processor, one or more attention pointers about the border of the virtual screen once the virtual screen within the FOV of the user.

In another embodiment, a system to generate attention pointers on a plurality of virtual screens is provided. The system includes: a processor configured to display an object within and outside a field of view (FOV) on a display to an user wherein the object outside the FOV are real objects; the processor configured to monitor for a change in the object within and outside the FOV; in response to a change, the processor configured to generate one or more attention pointers within the FOV of the user for directing user attention to the change in the object which is either inside or outside the FOV; and the processor configured to display on a virtual screen within the FOV to the user, the one or more attention pointers wherein the one or more attention pointers are dynamically configured to interact with the user in response to detections based on a movement of the user or the object within or outside the FOV of the user.

In various exemplary embodiments, the system further includes: the processor configured to identify an object inside or outside the FOV by generating an attention pointer configured as a highlight about the object. The system further includes: the processor configured to generate an attention pointer as a highlight about the object that dynamically changes as the object moves into the FOV of the user; and the processor configured to remove the attention pointer of the highlight about the object once the object is within the FOV of the user. The system, further includes: the processor configured to generating, by the processor, an attention pointer as a highlight of a border of a virtual screen when the virtual is screen is outside or outside in part of the FOV of the user that dynamically changes as the virtual screen moves into the FOV of the user; and the processor configured to remove the attention pointer of the highlight of the border of the virtual screen once the virtual screen is within the FOV of the user. The system, further includes: the processor configured to re-configure the one or more attention pointers by size, shape, and image for drawing user attention to the object. The system, further includes: the processor configured to update the one or more virtual screens within or outside the FOV of the user by the user select of an update button causing the processor to execute an update of content to the one or more virtual screens. The system, further includes: the processor configured to generate an attention pointer of a highlight of a real object as the object moves from outside to inside the FOV of the user. The system, further includes: the processor configured to generate one or more attention pointers about the border of the virtual screen once the virtual screen within the FOV of the user.

In yet another embodiment, a non-transitory computer-readable medium containing instructions thereon, which when executed by a processor initiates an attention pointer display app for performing a method for drawing attention to objects insider or outside a field of view (FOV) of an user is provided. The method includes: displaying, by a display of a mobile device, an object within and outside a field of view (FOV) of an user wherein the object outside the FOV are real objects; monitoring, by a processor of the mobile device, for a change in the object within and outside the FOV; in response to a change, generating by the processor one or more attention pointers within the FOV of the user for directing user attention to the change in the object which is either inside or outside the FOV; and displaying, by the processor, on a virtual screen within the FOV to the user, the one or more attention pointers wherein the one or more attention pointers are dynamically configured to interact with the user in response to detections based on a movement of the user or the object within or outside the FOV of the user.

In various exemplary embodiments, the method further includes: identifying, by the processor, an object inside or outside the FOV by generating an attention pointer configured as a highlight about the object. The method, further includes: generating, by the processor, an attention pointer as a highlight about the object that dynamically changes as the object moves into the FOV of the user; and removing the attention pointer of the highlight of the object once the object is within the FOV. The method, further includes: generating, by the processor, an attention pointer as a highlight of a border of a virtual screen when the virtual is screen is outside or outside in part of the FOV of the user that dynamically changes as the virtual screen moves into the FOV of the user; and removing, by the processor, the attention pointer of the highlight of the border of the virtual screen once the virtual screen is within the FOV of the user.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
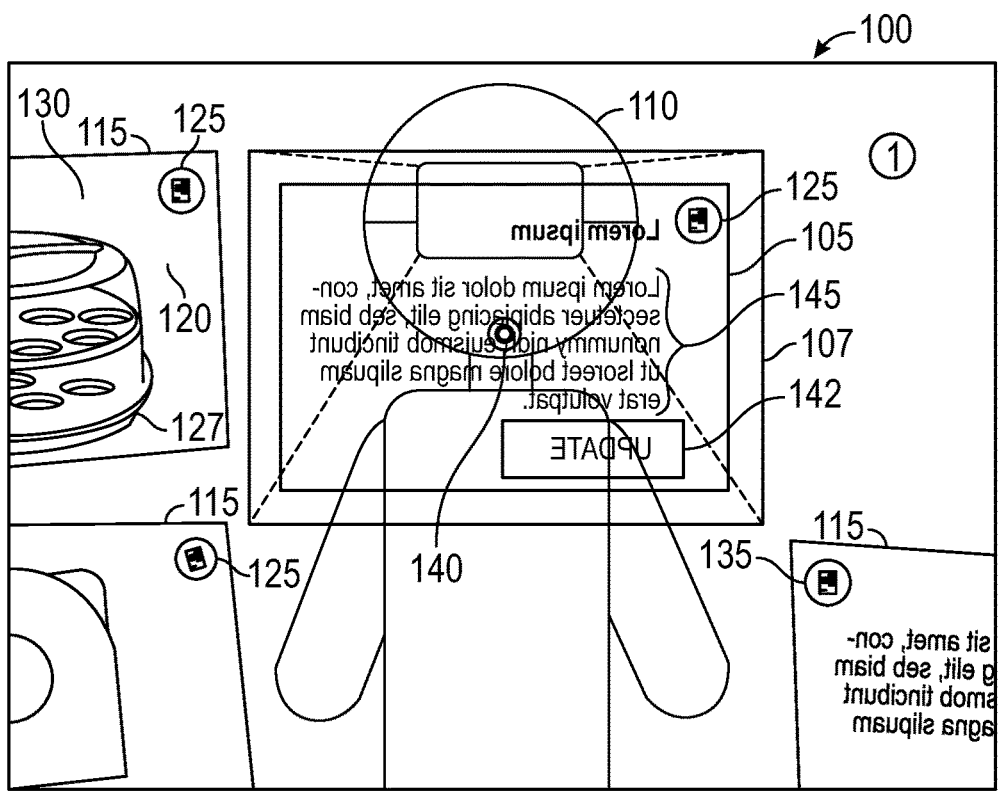
FIG. 1 illustrates a attention pointer display system configured for use with attention pointers in accordance with an embodiment.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The present disclosure describes methods and systems that are directed to drawing user attention to objects and content outside the FOV of the user in instances where the user's FOV is defined when wearing smart glasses or the like. For example, the user when wearing smart glasses may view outside the FOV of the smart glasses and see by peripheral vision the real world the real world and objects and things in the real world. The user may, in instances, see changes to these real world objects or things or the like. In other instances, the user when wearing smart glasses may not notice these peripheral changes that have occurred outside his FOV. Accordingly, a set of attention pointers is configured or generated within the FOV of user when the user is wearing the smart glasses to direct, on virtual screens inside the user's FOV notifications or markers to draw the user attention to changes of real objects and things outside the user's FOV of view so the user is made aware of the change.

In the disclosure, it is contemplated that references to augmented reality (AR) are defined as real world objects and things, with virtual objects and things displayed on a virtual screen; virtual reality (VR) are defined as computer generated, artificial and rendered objects and things displayed on a virtual screen; and mixed reality (MR) is defined as both AR and VR objects and things displayed on a virtual screen.

In an exemplary embodiment, inputs from wearable devices and interaction technologies enable a mobile user to work with the AR and perform tasks like selecting elements of objects of interest in reality of actual objects and display the objects on virtual screens where objects in AR are displayed with imagery and/or content on virtual screens. In addition, the objects and things displayed on augmented virtual screens are spawned with attention pointers within the users field of view of the user. Additionally, in the field of view data processing applications like foveate rendering can be used to reduce processor loads if needed. The virtual screens used can be head-worn virtual screens (HWD), mobile hand-held virtual screens, or other virtual screens that can be integrated or not into the physical reality, as desired.

While the present disclosures describes viewed objects used in AR/VR, it is contemplated that other sensed elements from haptic and aural notifications related to or of an object or things can be used as attention pointers or as notifications to draw user attention.

Another problem that comes with usage of AR and smart glasses is situational awareness. The content displayed in smart glasses often obscures the real world by interfering with the users field of vision and content displayed. This can be particularly dangerous when the user is moving, using stairs or when he or she is working in elevated places, as the obfuscated areas of visions by content displayed in the smart glasses can results in the viewer not seeing the impediments described and commonly found in a mobile users path.

The present disclosure uses the terms: as out-of-view when all the area or volume of a virtual screen and an object is out of a current field of view (FOV) of an user, a partly-in-view: when some of the area or volume of a virtual screen and object is in a current FOV of and user and some of the area or volume is outside the virtual screen and not in the FOV of the user; an in-view when all the area or volume of the virtual screen is visible in a current FOV; and in focus when objects and things are in the user's FOV on a virtual screen with an object (i.e. when the user is in front of the virtual screen).

The present disclosure describes systems and processes that enable displaying attention pointers that can point to either parts, changes, features of an "object", a "thing", or a "content" or to the "object", a "thing", or a "content" which it is deemed that the user should either pay attention to or at least know or should recognize that it is somehow important for understanding the content, thing or object displayed.

In various exemplary embodiments, the state of the attention point can be changed and the change in state of the attention point can be implemented with a congruous change in need of the user need to interact with object, thing or content. For example, as a virtual screen moves within a FOV of an user, the attention pointer's state can change to another state or disappear as the users' attention as already been drawn to an object or thing about to be displayed in front of the user in the virtual screen sliding in its entirety into the user's FOV; and the user no longer needs to interact with the attention pointer but needs to interact with the object or thing displayed on the virtual screen.

In various exemplary embodiments, the object, thing or content can fall within two main categories of a real object (any object or thing that is physically present in the real world, including other users, persons, etc.), and virtual object or virtual thing that may include a 3D model of a real-world object, or some other object or thing, such as (e.g., but not limited to) of virtual content displayed on virtual screen(s).

The present disclosure describes systems and processes that overcome at least the following three issues found with various AR/VR solutions that use smart glasses as follows: 1) the need to show larger amounts of content in a smart glasses simultaneously which leads to a display of content beyond the ability of the display of the smart glasses to be able to properly or easily be presented to a viewer; 2) the interacting with the content which is limited by the size of the display; and 3) a diminishing of an users situational awareness by obscuring of a particular content or content changes. Hence, when these issues are not addressed properly, it can lead to a decreased user experience and a lower user acceptance of AR/VR technology deployment due to perceived notions of missed content and content changes in the viewing experience as well as such AR/VR technology is still in its infancy when it comes to both deployment and acceptability.

In various exemplary embodiments, the present disclosure describes by use of integrated contents and the showing dynamic content, configurations that enables an intuitive control and interaction with a large amount of content into AR/VR domain without needing to use the established PC and tablet/smart phone displays for showing content and enabling manipulations such as changing of states of attention points in virtual screens which are suitable for use and encompassed in the FOV of smart glasses.

In various embodiments, the present disclosure describes spawning of attention pointers for drawing user attention to particular elements, things, and objects in an AR/VR image or an object corresponding to actual images and objects in reality.

FIG. 1 illustrates a attention pointer display system configured for use with attention pointers in accordance with an embodiment. In FIG. 1, in the attention pointer display system 100, the user 110 is viewing the virtual screen 105 and looking at the update button 142. The user 110 has a field of view (FOV) 107 which encompasses the virtual screen 105 (e.g. the FOV of smart glasses would include part of or the entirety of a virtual screen directly in front of the user). The center of the field of view 140 is located in this instance as the center of the virtual screen 105. The attention pointer display system 100 can be implemented in a HWD, or any computing device with a display; for example, in the case of a smartphone, the virtual screen 105 is a display of the smartphone. The virtual screen 105 is positioned in front of the user 110 and the virtual content is displayed in the virtual screen 105 and the virtual content cannot be displayed outside of the virtual screen. Additionally, one or more other virtual screens 115 can be configured about the virtual screen 105 at a location about or near another virtual screen 105 or in a multitude of other like ways.

The other virtual screens (or virtual screens 115) displayed are positioned around the virtual screen 105 and include as an example a set of other virtual screens 115. In order for an user to view the other virtual screens 115 in its entirety, the user would need to rotate his/her head for a viewpoint (i.e. point of view) directed to the other appropriate virtual screen displayed off center, that is if the current point of view of the user is not large enough to accommodate more than one virtual screens in the entirety. That is, the user may rotate his/her head to the right/left or up/down. The other virtual screens 115 are positioned in a manner relative to the user 110 and are enabled to rotate or change position in manner that is coordinated to the user 110 center of field of view 140. There are however constraints which can include the range of head motion for an user 110 and the performance by direct input of the content needed to be displayed.

Each other virtual screen 115 that is displayed can contain a different piece of content which can be either standalone or connected to other virtual screens 115 or the virtual screen 105 (e.g. showing schematics with highlighted area of interest on one other screen and having textual instructions with detailed description of work on another screen). Similarly, the icons for the attention pointers of icon 125 and 115 can be configured different to reflect the thing, object or content that is referenced in the associated virtual screen 115. For example, the icon 135 can be configured as a text icon for referring to text in the associated virtual screen 115. The icon 125, can be configured as a part icon for referring an element of a part displayed. This effectively extends the amount and kind of content that an user can access at any given moment, and enables the user to address content in prior virtual other screens that may be still visible in off center other virtual screen and from previous sections shown to the user without the need for the user to rotate back by input to the content displayed on the virtual screen 105. In addition, the content which is displayed on the virtual screen 105 maybe serially tracked through the virtual screens displayed to the user.

Further, with respect to FIG. 1, the other virtual screens 115 can be placed other to the virtual screen 105 in a position that is horizontal (i.e. side by side), vertical (i.e. above or below), or diagonal (i.e. tangential) to the virtual screen 105. The other virtual screens 115 can display content in greater detail than is shown on the virtual screen 105. For example, a user may select an icon or image 125 on the virtual screen 105. On the other virtual screen 115, the icon 125, can be displayed as a smaller scaled flower arrangement in the virtual screen 105 or, re-scaled by a factor or upscaled to occupy and present in a full screen display of the virtual screen 115.

Further, referring to FIG. 1, the user is positioned behind the virtual screen 105 and can view from the virtual screen 105 is in front of the user, The icon 125 and icon 135 are both different and each of them can be associated with a particular kind of content. That is, icon 125 is associated with an element of a part 127 (i.e. an object) and the user 110 upon viewing the icon can know what type of content is displayed in the other virtual screen 115. Also, if that window's content is updated, the same icon i.e. icon 125 or 135 is displayed as an attention pointer.

In various exemplary embodiments, the virtual screen 105 includes text 145 displayed and an update button 142 to update the content (i.e. the text 145) viewed with new real-time information or to send a request for new real-time information about the content displayed. In addition, a cursor or gaze identifier 140 which could be an image cursor or gaze identifier connected to an additional sensor such as an inertial measurement device (not shown) which in turn can be connected to the user 110, to detect a user's gaze direction and to enable actions such as object rotations by the user 110 in an angular vertical direction and an angular horizontal direction and to re-position the content. In this case the text 145 and the update button 142 placed in a better viewing direction or angle for viewing by the user 110. Also, foveate rendering can be used to draw the user attention to elements or aspects of the object or content by realizing a volume in a virtual screen in focus or out of focus. That is, the user 110, in a particular instance, can be positioned and the user 110 view be directed to one of the virtual screens and volumes of the virtual can be realized to be in-focus by foveate rendering to direct the user attention. In an exemplary embodiment, the center of the field of view 140 in FIG. 1 may be integrated with a HWD worn by the user 110 or may be connected to a standalone device with BLUETOOTH® or WIFI® or other possible (including wired) connectivity to processors of an aircraft, vehicle or a HWD. As the user 110 rotates his/her body or head in the direction of a particular virtual screen, the center of the FOV 140 changes and moves to another virtual screen or the like that the user's 110 attention is directed to or about to be directed to. This movement of the center of the point of view 140 data is sent to the processors of the vehicle or HWD and the content displayed on the other virtual screens 115 is dynamically moved or inserted as the appropriate virtual screen in response to the user 110 rotations or in response to particular position of the user 110.

In various exemplary embodiments, the center of the FOV 140 can be located as the center of the virtual screen on the head/smart glasses of the user 110 coupled with sensors to the torso of the user 110 and configured for action in response to sense changes in the X, Y, Z axes and further configured to determine using various algorithms, the use history for positioning objects in each virtual screen.

Figure 2:
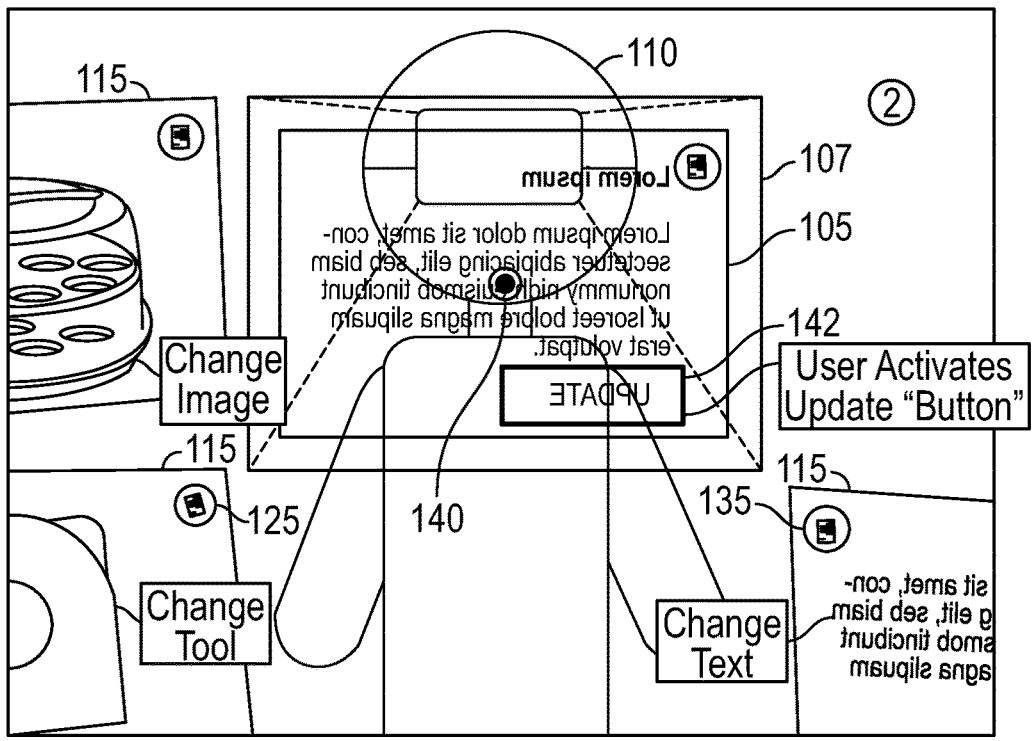
FIG. 2 illustrates a attention pointer display system configured for use with attention pointers in accordance with an embodiment.

FIG. 2 illustrates a attention pointer display system configured for use with attention pointers in accordance with an embodiment. In FIG. 2 (like FIG. 1) a attention pointer display system 100 is implemented in a HWD or like device which includes a field of view 107 of an user 110 that encompasses a virtual screen 105 positioned in front of the user 110. The other one or more other virtual screens 115 which may be configured about the virtual screen 105 are outside the field of view 107 of the user 110 and at a location other or nearly other to the virtual screen 105. In this case, the user 110 is selecting the update button 142 and activates the update button 142 which in turn changes the content displayed in the other virtual screens 115. In addition, congruous with the change of content in the other virtual screens 115, the icons 125 and 135 are also changed to match the content displayed. When user progresses with the procedure such a procedure for an aircraft, the content display application will proceed to a next step each of the content on the virtual screen 105 and other virtual screens 115 changes in a manner to enable the user 110 to view corresponding schematics, tool screens that coincides with the changes to the virtual screen 105. The changes may occur in other virtual screens 115 that are not in view too. That is for clarification, when the virtual other screens 115 are not in view, then the virtual screen 105 represents user's field of view 107 in a smart glass display where the smart glasses are not able to render images outside the virtual screen 105, so instead of viewing the other virtual screen 115, the user 110 will see the actual or real world about the user 110 when looking outside the FOV. Further, in the case of virtual reality displays (where generally the field of view 107 is much bigger—usually 180+ degrees), the user 110 is able to see the other virtual screens 115. In this case, the field of view 107 can be configured to be much larger to encompass part, or all of the virtual screens 115.

Figure 3:
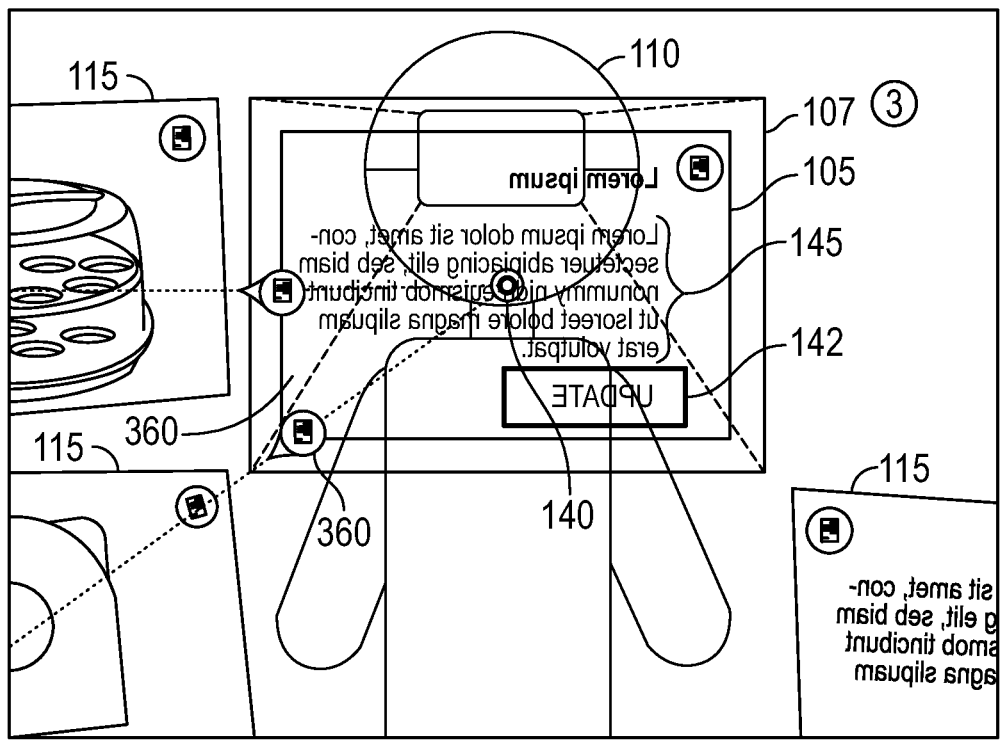
FIG. 3 illustrates a attention pointer display system configured for use with attention pointers in accordance with an embodiment.

FIG. 3 illustrates a attention pointer display system configured for use with attention pointers in accordance with an embodiment. In FIG. 3 there is shown two ATPs triggered by an updated content in bottom and left other virtual screens 115. In FIG. 3 (like FIG. 1) a attention pointer display system of a layout 100 implemented in a HWD or like device which includes a virtual screen 105 positioned in front of the user 110, one or more other virtual screens 115 which may be configured about the virtual screen 105 at a location other or nearly other to the virtual screen 105. In FIG. 3, each of the ATPs 360 are configured to point to the other virtual screens 115 in instances in which the content has changed. Each ATP 360 can be configured by a content display application to point to the other virtual screen 115 to inform or provide notice of a change or update that has or will occur with respect to a content displayed in the virtual screen 105. For example, if the user 110 updates via update button 142, the text 145 display on the virtual screen 105, the other virtual screens 115 will be displayed in a manner that corresponds to the update of information to present the updated information to the user 110. That is, the user 110 will be guided by various ATPs 360 or a change in the ATPs 360 presented in a manner about the text 145 for selection by the user 110 by various input devices. The selection may be user driven or automated, but will serve as trigger to display information in the other virtual screen 115 that is referenced by the ATP 360 to inform the user 110 of the change. The ATP 360 which references or points out of view content should obscure as little of the screen as possible but be clearly noticeable, and the ATP 360 representing the in-view change should limits its appearance to the screen/object and its nearest vicinity to obscure as little as possible.

Figure 4:
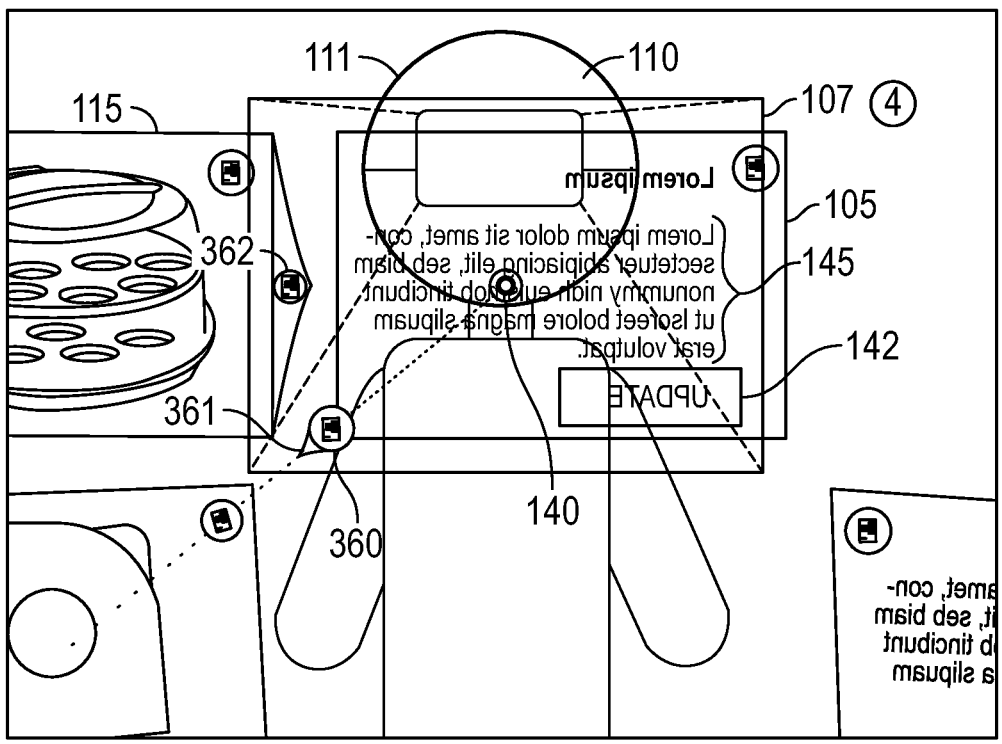
FIG. 4 illustrates a attention pointer display system configured for use with attention pointers in accordance with an embodiment.

FIG. 4 illustrates a attention pointer display system configured for use with attention pointers in accordance with an embodiment. In FIG. 4, the user 110 starts turning his/her head 111 right (the movement is illustrated in FIG. 4 reversed because the user 110 is depicted standing behind the virtual screen 105) which dynamically transforms (i.e. changes the appearance, reconfigures etc.) the ATP into another form (in this case, the ATP is dissolved or made to disappear into left virtual screen as the ATP enters into the user's field of view 107). In FIG. 4 (like FIG. 1) a attention pointer display system 100 is implemented in a HWD or like device which includes a virtual screen 105 positioned in front of the user 110, one or more other virtual screens 115 which may be configured about the virtual screen 105 at a location near or not to the virtual screen 105. In FIG. 4, the ATP 360 is configured to point 361 to the other virtual screens 115. As the user 110 moves his head 111 towards the virtual screen 115 and away from the virtual screen 105. That is, the center of the FOV 140 of user moves toward the center of the virtual screen 115, an attention pointer (ATP) display application (not shown) of the attention pointer display system 100 generates data generated of the movement of the center of the FOV 140 from virtual screen 105 to virtual screen 115 and determines that the virtual screen 115 is entering or sliding into a field of view (FOV) 107 of the user while the virtual screen 105 is sliding out of the FOV 107 of the user. The ATP 362 is configured to automatically change its appearance for better interacting with the user 110 as the FOV 107 of the user 110 is changed. That is, the situation awareness of user is increased by the notification to the user 110 by the user 110 viewing the change in appearance of the ATP 362 that the virtual screen 115 is sliding into the user's FOV. In addition, the ATP 360 is configured to better express the referencing with the another virtual screen 115 and at the same time be placed in position to less obscure the information displayed on the virtual screen 105 sliding into the FOV 107 of the user 110.

From each user's 110 field of view, as multiple other virtual screens 115 are displayed with objects or items that relate to each other and which are displayed on other virtual screen 115 or in the virtual screen 105, the pointer 361 direct of the ATP 360 can direct the user attention. In an exemplary example, the related ATPs 360 and pointers 361 will all have a similar or same appearance when displayed to provide immediate notice to the user 110 of the same or similar relations between sets of ATPs 360. Each ATP 360 will have the same or similar appearance or differ from other ATPs 360 so that the user will be able to visually identify the differences between ATPs 360 and further conveniently identify (i.e. recognize or know where to find by visual notice) the information associated with a particular context of the information displayed on the virtual screen 105.

Figure 5:
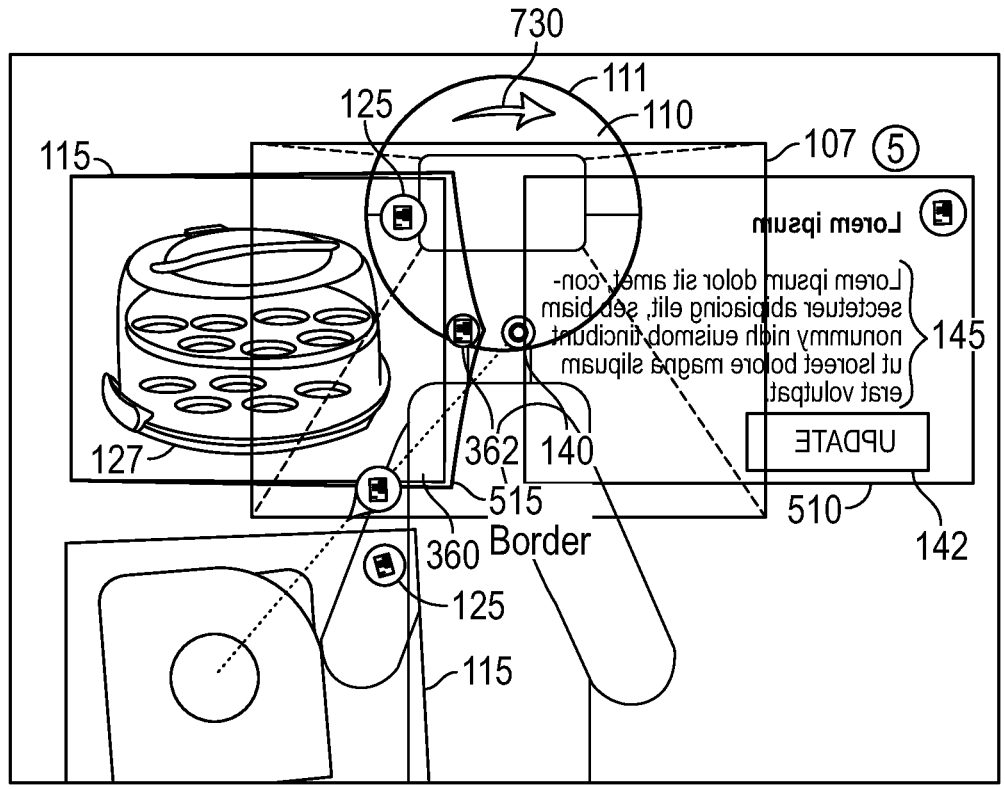
FIG. 5 illustrates a attention pointer display system configured for use with attention pointers in accordance with an embodiment.

FIG. 5 illustrates a attention pointer display system configured for use with attention pointers in accordance with an embodiment. In FIG. 5, the user 110 continues rotating his head 111 in the right direction 730 as more of virtual screens are presented in the user 110 field of view 107. The border 515 of another virtual screen 115 is highlighted as the virtual screen 115 slides into the FOV 107. This designates a dynamic change in configuration of the ATP 362 with the border 515 highlight as the virtual screen 115 moves towards to the center of the FOV 140 or more into the FOV 107. In this case, the ATP 362 is configured as a circle that is dynamically changing or disappearing as the border 515 emerges and is dynamically highlighted. In FIG. 5 (like FIG. 1) a attention pointer display system 100 is implemented in a HWD or like device which includes a virtual screen 105 positioned in front of the user 110, one or more other virtual screens 115 which may be configured about the virtual screen 105 at a location to the virtual screen 105. In FIG. 5, the ATP 360 is configured to point to the other virtual screens 115. The center of the field of view 140 moves to another virtual screen 115, as the user 110 rotates his/her head 111 towards another virtual screen 115 and the ATP 362 associated with the another virtual screen 115, in instances can be enabled to cease to remain visible and disappear. That is, the ATP 362 is configured to operate in a visible mode and then to cease in operation or to change in mode to an invisible mode or other mode once within the FOV 107 of the user 110 or in part of the FOV 107 of the user 110 or as desired when moving into the FOV 107. This is because the ATP 362 is implemented to draw attention of the user 110 to elements, changes or other details in the content that is displayed on the virtual screen 115 but is no longer needed as the virtual screen 115 shifts in and out of the FOV 107 of the user 110. Once, the user's 110 attention is drawn to a particular virtual screen, in this case the virtual screen 115; in this instance, the ATP 360 is configured to cease to exist and to disappear from view of the user 110 so as to not clutter or interfere with the FOV 107 of the user 110. The ATP 360 is not limited to this particular configuration of ceasing to exist at a particular action or positional change of the user 110 (i.e. the virtual screen 115 moving within the FOV or the user 110 turning his/her head 111 to the virtual screen 115), but can easily be configured to remain visible if desired or to change color, shape, appearance. In other words, there are a multitude of ways that the ATP 360 can be configured or changed in response to an user's 110 movement or action.

Figure 6:
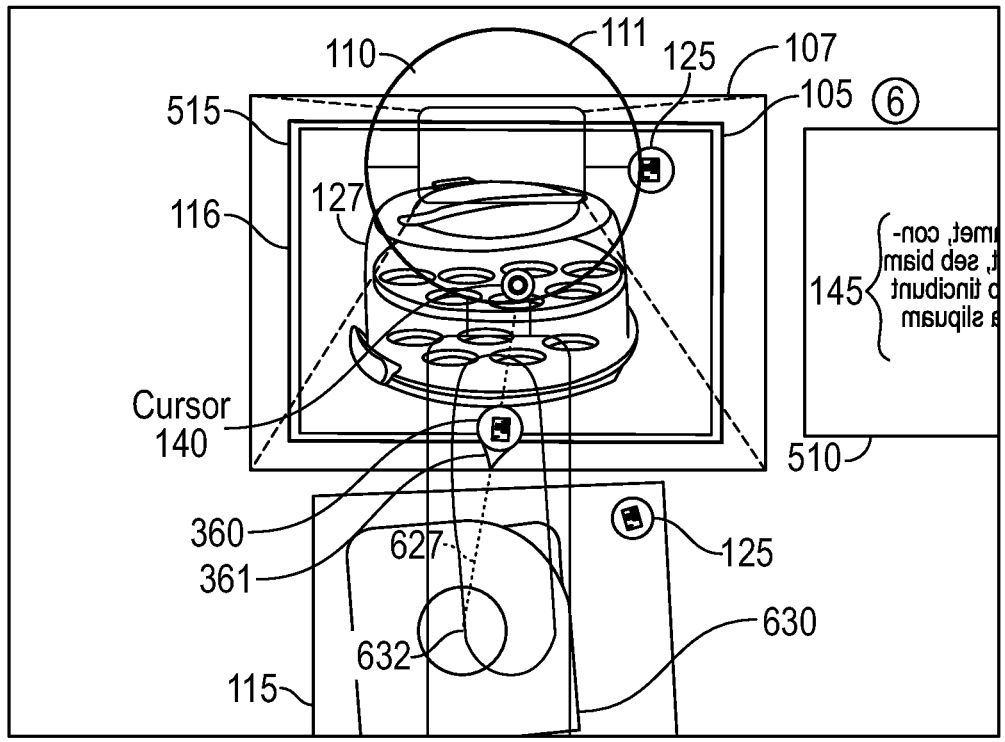
FIG. 6 illustrates a attention pointer display system configured for use with attention pointers in accordance with an embodiment.

FIG. 6 illustrates a attention pointer display system configured for use with attention pointers in accordance with an embodiment. In FIG. 6 (like FIG. 1) an attention pointer display system 100 is implemented in a HWD or like device which includes a virtual screen 105 positioned in front of the user 110, one or more other virtual screens 115 which may be configured about the virtual screen 105 at a location other than the location of the virtual screen 105. In FIG. 6, the content (i.e. the text 145) in the virtual display 510 is slid or moved out of the FOV 107 defined as example by smart glasses (not shown) worn by the user 110. The border of the virtual screen 115 is highlighted as the virtual screen 115 moves into the FOV 107 of the user 110. The ATP 360 has been repositioned to point 361 in a field of view 107 of an user 110 to another virtual screen 115 and to direct the user's 110 attention to the other virtual screen 115 when viewing the virtual screen 105. A dotted line 627 can or cannot be made visible in the directions of the point 361 of the ATP 360. Alternately, the dotted line can be considered only for illustration purposes to demonstrate that ATP 360 is positioned on the intersection of edge of FOV 107 with the line connecting center of FOV 140 with center 632 of the object 630 so that the user attention is drawn to the center 632 of the object 630 in the other virtual screen 115.

Figure 7:
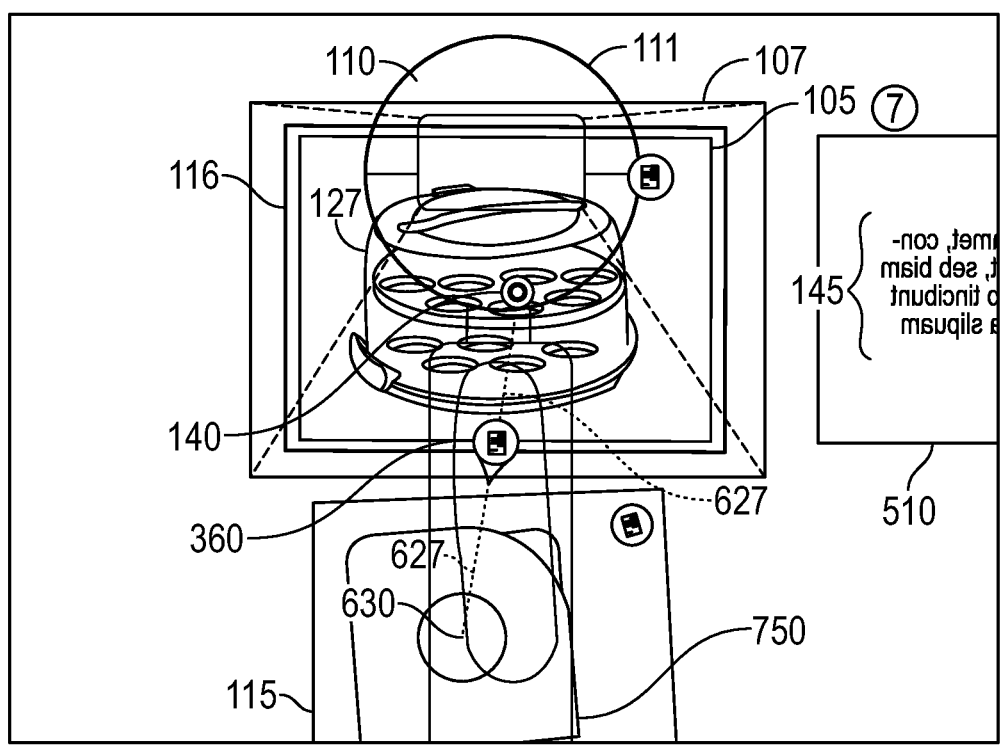
FIG. 7 illustrates a attention pointer display system configured for use with attention pointers in accordance with an embodiment.

FIG. 7 illustrates a attention pointer display system configured for use with attention pointers in accordance with an embodiment. In FIG. 7, the virtual screen 115 highlighted in FIG. 6 is returned to normal as the user center of FOV 140 is positioned in the center or close to that of the virtual screen 115 or the virtual screen 115 is in the FOV 107 in its entirety. 750 is not a scaled image of part 127, but a tool user needs for this particular step—in this case, it is a measuring tape. In various exemplary embodiment, for example (with reference to FIG. 1), the virtual screen 105 which is the central screen may show textual instructions, a virtual screen 115 on the left may show an image or blue print, and a virtual screen below may show (i.e. 750 of FIG. 7) a tool required to execute textual instructions. Additionally, in this example, the bottom right virtual screen 115 may show another image as desired.

In various exemplary embodiments, different types of modality can be displayed of the ATP 360 in the virtual screen 105 and the other virtual screens 115. For example, for an out-of-view, a modality of the ATP 360 may be configured where the ATP 360 is an object image which is displayed at the edge of the field of view of the virtual screen 105 and is centered or positioned on a dotted line 627 that visually (as illustrative as desired) connects both virtual screens and to a part and part section displayed between both virtual screens. In such instances, the position of camera (not shown) would be centered about the part of interest or centered in the virtual screen 105 which is likely in the FOV of the user 110.

In various exemplary embodiments, a star or a triangle can be generated as an ATP which can be configured in a color determined by an app to which it corresponds and which will be triggered on selection, or can be determined by the attention pointer display system, color based regulations, or by a selection of a color type by the user 110.

Figure 8:
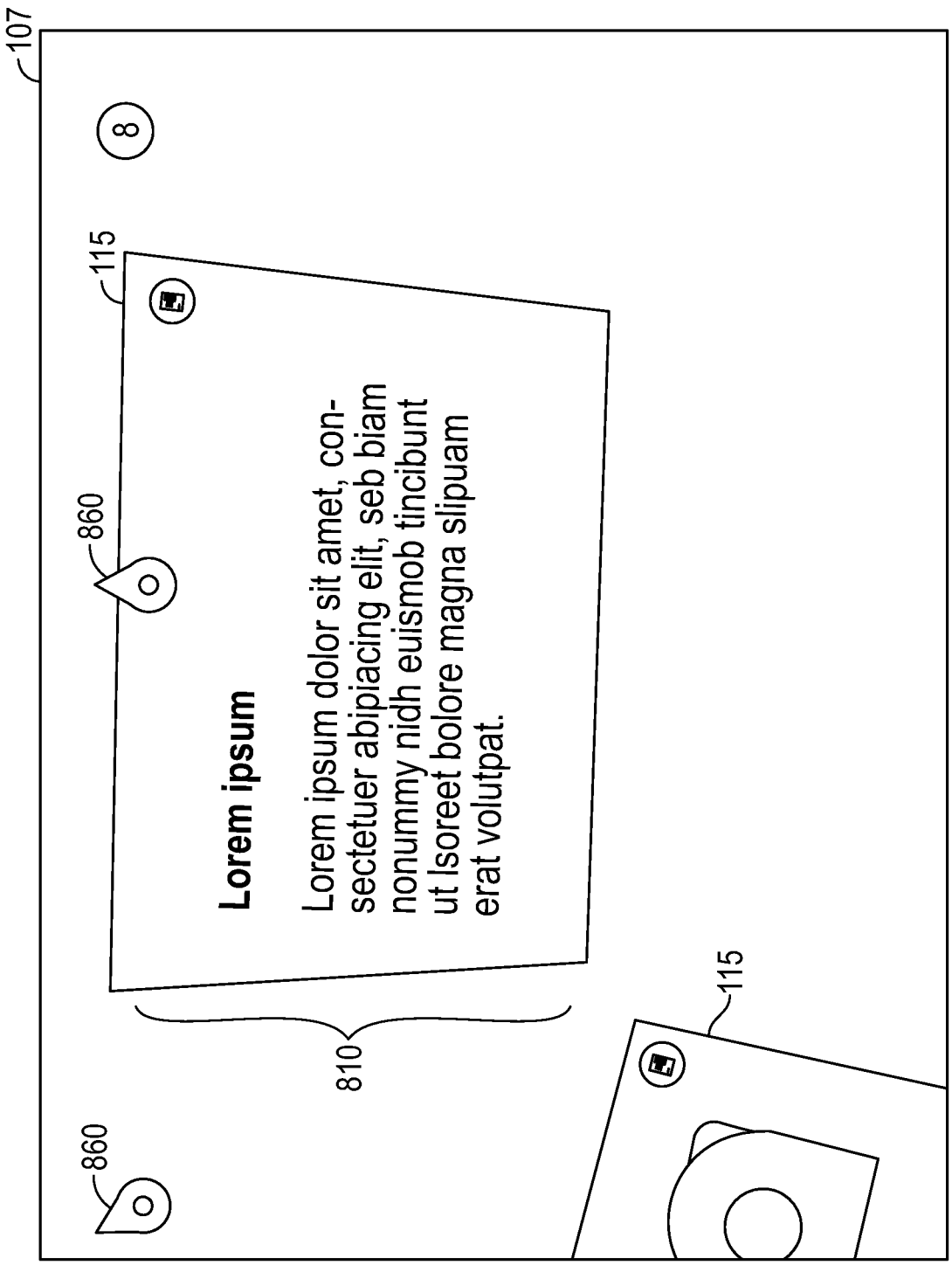
FIG. 8 is an exemplary of random text in a virtual screen associated with attention pointers in accordance with an embodiment.

FIG. 8 is an exemplary set of action statements of the attention pointer display system that can be used with ATPs for guiding a user in accordance with an embodiment. In FIG. 8, the virtual screen 115 in the FOV 107 has dummy text marked as "lorem Ipsum" 810. In other exemplary embodiments, it can be as an example, random list of actions etc. . . . . FIG. 8 illustrates the attention pointer display system from the user's (not shown) point of view. The user is viewing two virtual screens 115 within the users FOV 107 with an ATPI 860. In various embodiments, FIG. 8 in its entirety with an outer border (not shown) represents the user's field of view (107 on FIGS. 1-7).

In various exemplary embodiments, at ATP 360 (of FIG. 1-7) or 860 of FIG. 8 can be configured in spawning actions to suddenly appear, pulse, blink, blink then settle for drawing user attention to elements of a particular part, object, image etc. The ATP 860 can be displayed in a periodical manner for the ATP 860 for a period of time and then extinguished from view. The ATP 860 can be displayed in an intermittent manner for the ATP 860 to appear, disappear and re-appear until a final dismissal. This intermittent display could be triggered by various user actions as the user is guided through for example a service operation etc.

Figure 9:
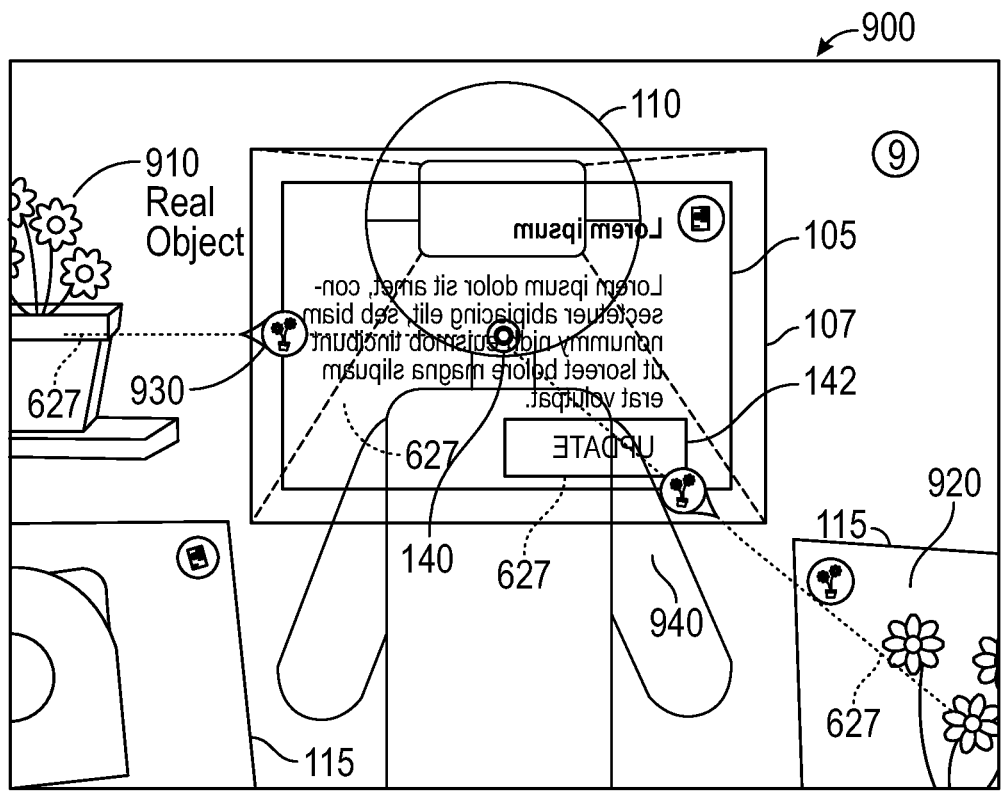
FIG. 9 illustrates a attention pointer display system configured for use with attention pointers in accordance with an embodiment.

FIG. 9 illustrates a attention pointer display system configured for use with attention pointers in accordance with an embodiment. In FIG. 9 an attention pointer display system 900 is implemented in a HWD or like device which includes a virtual screen 105 is positioned in front of the user 110 and one or more other virtual screens 115 can be configured about the virtual screen 105 at a location near to the virtual screen 105. In FIG. 9, the content in the virtual screen 105 has been updated (i.e. the user 110 has executed the update button 142 and the ATPs 930 and 940 have been generated (i.e. similar to as in FIG. 3, after the user 110 has triggered a content update as in FIG. 1 and the content updated in FIG. 2). In FIG. 9 one of the updates is an update directed to the actual (i.e. real) object (although in other instances the object can be configured as a virtual 3D object); nevertheless, the update procedure remains the same). In FIG. 9, an actual object 910 (i.e. concrete form subject to user observation) corresponds with information displayed in a virtual screen 105 and a synthetic generated object or the like model 920 for guiding, describing or associating elements between the actual object 910 and the model 920.

The actual object 910 is the object viewed outside the FOV 107 of the user 110 in the real world and this actual object is pointed to by ATP 930 to give the user 110 notice of it, notice of changes to it, and any other information about it. The virtual screen 105 is in communication with user 110 displaying content information or the like about the actual object 910.

In various exemplary embodiments, the ATPs can be tied together with haptic vibrations or aural sounds. For example, portions of the dotted line 627 can be displayed in a step by step manner with an associated haptic action or aural sound. The aural sound can be configured as a simple sound or surround sound or other a multitude of other varieties like sound-bites, character voices etc. so the user 110 can perceive the point of origin which may in instances be inside or outside the virtual screen 105. Likewise, the haptic vibrations can be configured as simple, complex, surround, loud, soft etc. types of notifications to the user 110.

Figure 10:
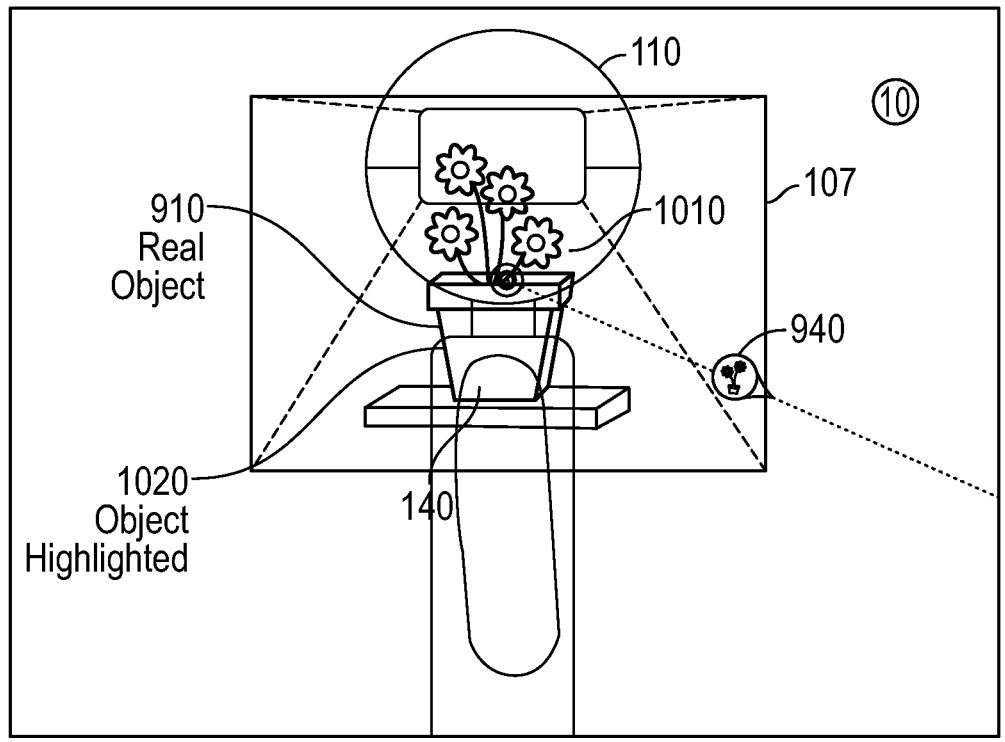
FIG. 10 illustrates a attention pointer display system configured for use with attention pointers in accordance with an embodiment.

FIG. 10 illustrates a attention pointer display system configured for use with attention pointers in accordance with an embodiment. In FIG. 10, the user has viewed the object 910 (i.e. the object is within the FOV 107 of the user without a virtual screen) and the object has been highlighted 1020 so that the object 910 stands out or more pronounced in the FOV. The ATP 940 point to a virtual screen (not shown) with information about the object 910. The object 910 is a real object that is within the FOV 107 which is not a virtual screen that is viewed by the user and the virtual screens of FIGS. 1-9 is not present in this embodiment. FIG. 9 is an exemplary embodiment without the use of the virtual screen because the attention pointer display system can be implemented without the virtual screen. Hence, the virtual screens are used, and the attention pointers point to a "thing" which user 110 is deemed that he/she should either pay attention to or at least know that it is somehow important for him (e.g. the "thing" state has changed, the user needs to interact with it, etc.).

Figure 11:
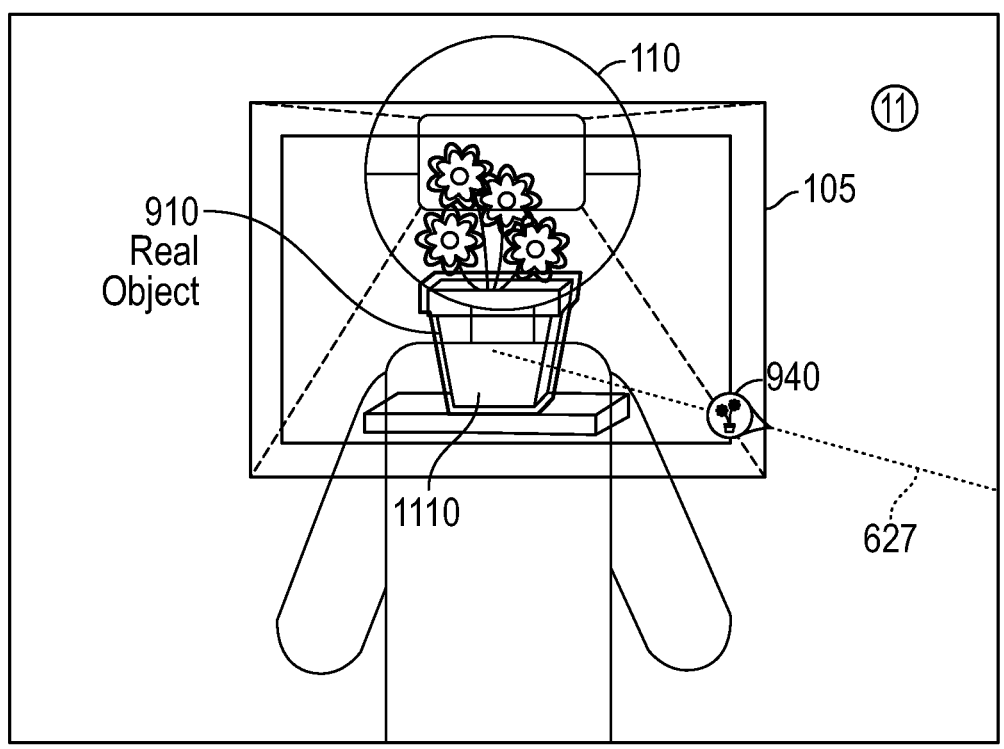
FIG. 11 illustrates a attention pointer display system configured for use with attention pointers in accordance with an embodiment.

In FIG. 11, after the user has been notified this is the real object 910 has been changed/updated/etc., the highlight 1120 of the real object 910 disappears and user 110 can view the real object 1120 as it is (i.e. without any highlighting).

In various exemplary embodiments, while the ATP is represented in certain instances as in image, it is contemplated that there are a variety of ways to represent or implement the ATPs. For example, there are many possible ways when or how to present the ATP to the user 110. When presenting a spawning of ATPs this can be enabled or initiated by a change in a screen or an object. The type of ATP form that is used can be configured based or dependent on a severity determination in a screen and an object location with respect to a current view displayed of a scene in a virtual reality display.

Figure 12:
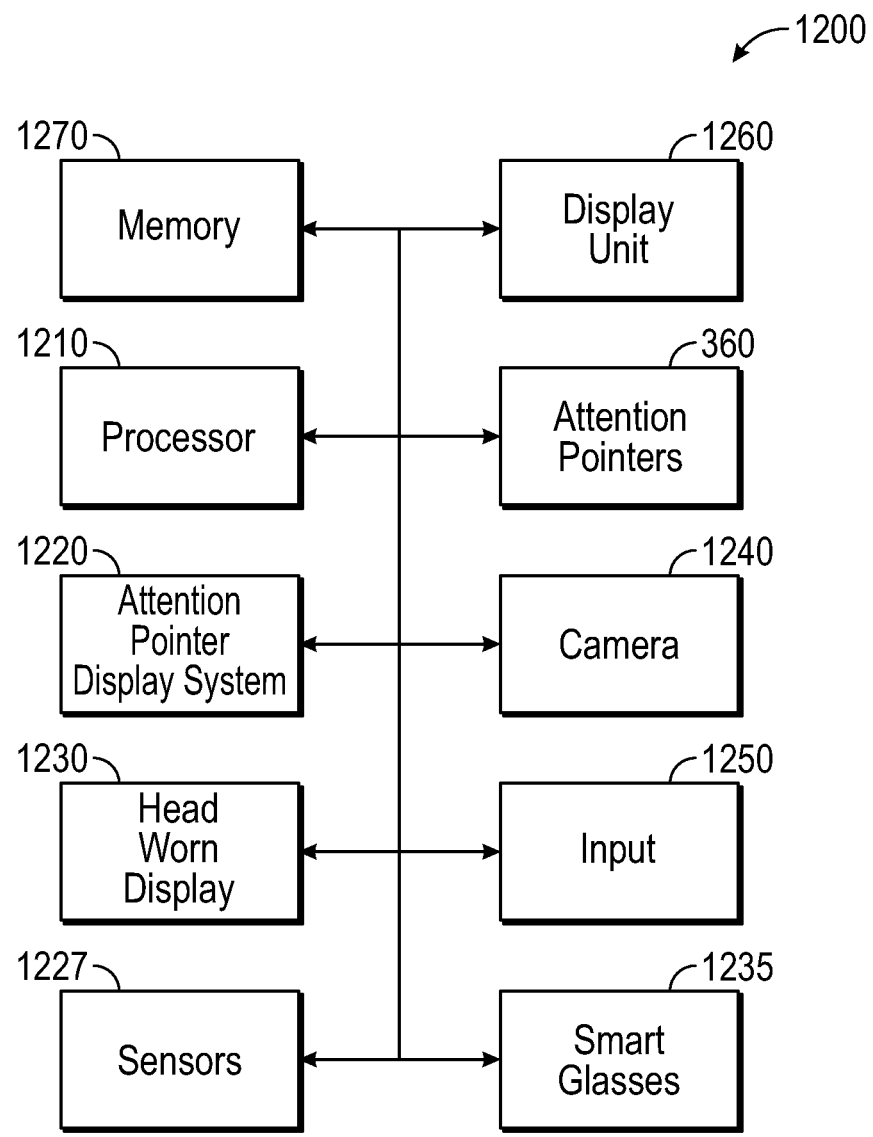
FIG. 12 is a block diagram of an exemplary assistance system configured for guidance provided with attention pointers of an attention pointer display system in accordance with an embodiment.

FIG. 12 is a block diagram of an exemplary assistance system configured for guidance provided with attention pointers of an attention pointer display system in accordance with an embodiment. In FIG. 12, there is shown an exemplary assistance system 1200 for guiding a user 110 includes a processor 1210 executing an attention pointer display application 1220 for spawning attention pointers 360. The processor 1210 may be a central processing unit (CPU), graphical processing unit (GPU), a physics processing unit (PPU), an application specific integrated circuit (ASIC), a microprocessor, an field programmable logic array, or any other logic circuit or combination thereof. In one embodiment, for example, the processor 1210 may be housed in a head worn display (HWD) 1230 or connect to smart glasses 1235 used to determine a field of view 207 of an user.

In another embodiment, for example, the processor 1210 may be housed in a technician mountable system (not illustrated), such as in a belt or bag which the technician could wear. In addition, the processor 1210 may be configured to identifier a center of a FOV 140 or configured with additional sensors 1227 to monitor movement or motion of the user 110.

In various exemplary embodiments, the processor 1210 may also be coupled to a camera, the HWD 1230 and smart glasses 1235 or a combination with the additional sensors 1227 for viewing objects within and outside a field of view by a communication system including Bluetooth system, a ZigBee system, a cellular system, a Wi-Fi system, or any other type of communication system, or combination thereof. In another embodiment, for example, the processor 1210 may be located remotely from the technician.

In an embodiment, for example, the processor 1210 may be in a server or other general purpose computer and may communicate with the other components of the assistance system 1200 via one or more of the wireless systems.

The head worn display (HWD) 1230 or a virtual reality headset, mobile phone, tablet or the like; in other words it may be any transparent display that presents data without requiring users to look away from their usual or normal viewpoints. It can be also a non-transparent display which either does not completely obscure an user's normal field of view (e.g. other hands-free interaction solutions); or HWD 1230 that streams live video, so the user feels like wearing a transparent display for full immersion with mixed reality experience. In one embodiment, for example, the HWD 1230 may be incorporated into a head mounted device of the user like a technician could wear when performing a. In various alternate embodiments, the HWD 1230 may be incorporated in a mobile device including a smart pad or smart phone or even a set of standalone monitors.

In various exemplary embodiments, the HWD 1230 may display virtual screens within or outside the FOV of the viewer with a particular virtual screen with attention pointers drawing the users attention at any given time as shown in described FIGS. 1-11.

The processor 1210 provides the interface between the HWD 1230 (i.e. the virtual screens) and the systems/data to be displayed and generates the attention pointers 360 to be displayed by the display unit 1260, as discussed in further detail below.

The system may further include a camera 1240. In one embodiment, for example, the camera 1240 may be incorporated into or mounted on the safety head mounted devices 1230 (i.e. glasses or the like) and can be used to capture the real object for display in the AR/VR domain. As discussed in further detail below, the processor 1210 analyzes data from the camera 1240 to detect objects in the environment to aid the technician in a task by displaying attention pointers for drawing the technician's attention and can be used to record a task for quality assurance purposes.

The assistance system 1200 further includes an input system 1250. In one embodiment, for example, the input system 1250 may be a microphone. In this embodiment, a technician (i.e. user 110) may interact with the assistance system 1200 by speaking into the microphone. The processor 1210 would then analyze the speech and output a response to aid the technician in a task such as executing selection of an attention pointer to show information of an element of an object displayed. In this embodiment, for example, the input system 1250 may be incorporated into or mounted on the safety head mounted devices 1230.

In other embodiments, for example, the input system 1250 may be a keyboard. The keyboard may be a physical keyboard or a virtual keyboard. An image of a keyboard, for example, may be overlaid onto any surface by the HWD 1220. The processor 1210 may then analyze data from the camera 1240 to determine if the technician is pressing any of the keys on the virtual keyboard. The virtual keyboard may be a standard QWERTY style keyboard or may be a customize keyboard appropriate for the task. In another embodiment, for example, hand gestures may be captured by the camera and processed into commands by the processor 1210. In yet other embodiments, for example, a touch display may be provided as the input system 1250. Any combination of input systems may be used.

The system 1200 further includes a memory 1270. The memory 1270 may be any non-transitory computer-readable memory. In one embodiment, for example, the memory may be housed in a technician mountable system, such as in a belt or bag which the technician could wear. In another embodiment, for example, the memory 1270 may be located remote from the technician. In this embodiment, for example, the processor 1210 may be communicatively coupled to the memory 1270 via a wireless communication system, as discussed above. The memory 1270 may store non-transitory computer-readable instructions for operating the system 1200, as discussed in further detail below.

The memory 1270 may also store task data as well as data related to mixed reality imagery including AR images. The task data may include data defining the steps in a task and related AR step data to assist the technician in performing the task. The task data may also include multiple images, 3-D models of various components involved in a task and augmented display items of various facets of the components and the task for a mixed reality, VR and AR display displayed.

The AR/VR imagery of images or 3-D models may be stored, for example, at each stage of a task. The images or 3-D models may be stored, for example, by a technician who previously performed the task or they (images/3D models) may be created in a preparation phase (only once per aircraft). As discussed in further detail below, the processor may compare an image/model taken by the camera 1240 to one or more of the stored images/models to determine if a task was completed correctly. The processor 1210 could determine that a task was completed correctly if the image/model taken by the camera matches the image/model stored in the memory. The task data may also include three-dimensional model data of components to be serviced.

Figure 13:
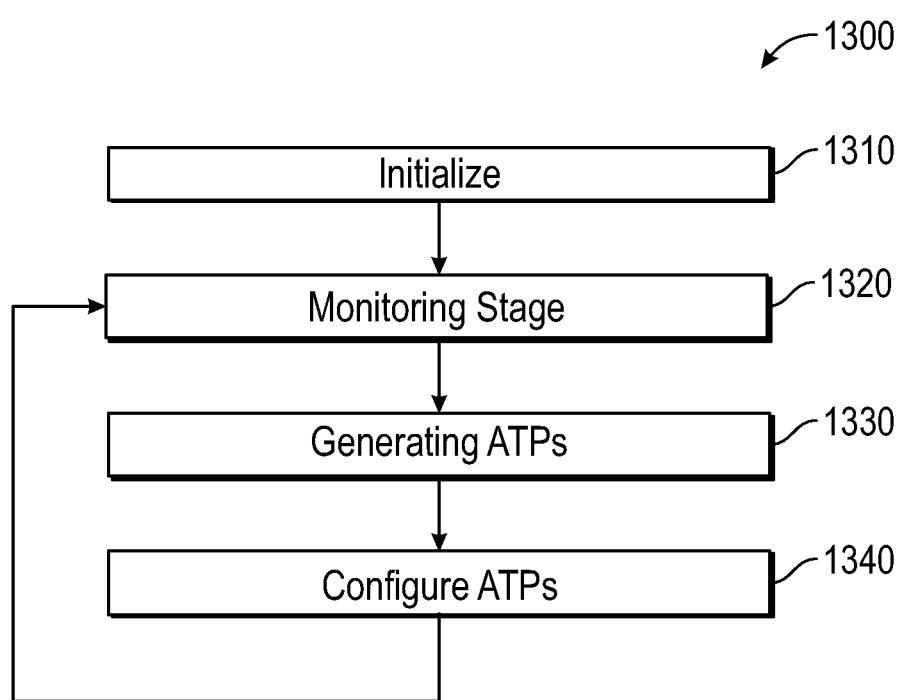
FIG. 13 is a flowchart 1300 of a process for configuring one or ATPs for identifying with a gaze detector, parts of an object, and for spawning the ATPs about the object for guiding the user in a service operation, in accordance with an embodiment

FIG. 13 illustrates a tree diagram 1300 of a process for configuring one or ATPs for identifying with a gaze detector, parts of an object, and for spawning the ATPs about the object for guiding the user in a service operation, in accordance with an embodiment.

In initially, at step 1310, the attention pointer display system is initialized and the relevant data is loaded. At step 1320, the attention pointer display system is placed in a hold state acting as a watchdog for a change to occur inside or outside the FOV of the user. If a change is detected, then at step 1330, a set of ATPs are generated and configured about the objects, things etc. for any objects real or virtual that need or require notification to the user whether the changes, or content displayed are within or outside the FOV. At step 1340, the attention pointer display system implements the ATPs within and outside the FOV as deemed necessary. For example, the ATPs can be configured in various states or actions such as blinking, disappearing, changing style, size, change. At step 1340, the attention pointer display system highlights, or not highlights objects and things within and outside the FOV as the objects or things on virtual screens move into or out of the user's FOV. Further, once an object or thing is encompassed in the user's FOV or its center coincides, matches within a defined distance or approximation, having the highlight disappear. After which reverting back to step 1320 and monitoring for change activity or other events to spawn or generate attention pointers.

It is contemplated that the order of the steps in FIG. 13 (i.e. tasks 1310 to 1340) may be changed, re-configured as desired, reduced, and augmented in an arbitrary manner or by a particular as assignment, and the order of steps presented is an exemplary embodiment that should not be construed as limiting.

In various exemplary embodiments, the present disclosure describes by use of integrated contents with attention pointers configurations of virtual objects and parts that enable an intuitive control and interaction with a large amount of content in an AR domain without needing to use the established PC and tablet/smart phone paradigms for showing content and manipulation, which are not suitable for use with smart glasses or head worn virtual screens.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer content. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown depicts one exemplary arrangement of elements, additional intervening elements, devices, features, or components may be present in an embodiment of the depicted subject matter.

For the sake of brevity, conventional techniques related to signal processing, data transmission, signaling, network control, and other functional elements of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit including custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, include one or more physical or logical modules of computer instructions that may, for instance, be organized as an object, procedure, or function. Nevertheless, the executables of an identified module need not be physically located together, but may include disparate instructions stored in different locations that, when joined logically together, include the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method, comprising:
    displaying, by one or more processors, in a display, a first virtual screen, wherein a center of the first virtual screen is located at a center of a field of view (FOV) of a user;
    displaying, by the one or more processors, one or more attention pointers on the first virtual screen within the FOV of the user, wherein a first attention pointer of the one or more attention pointers is configured to provide an indication of an update in a content displayed on a second virtual screen different from the first virtual screen;
    changing, by the one or more processors, an appearance of the first attention pointer in response to determining that the center of the FOV of the user is moving towards the second virtual screen; and
    causing, by the one or more processors, the first attention pointer to disappear from the FOV of the user in response to determining that the center of the FOV of the user is within the second virtual screen.

2. The method of claim 1, further comprising:
    identifying, by the one or more processors, at least one object within the FOV and at least one object outside the FOV based on the one or more attention pointers and a highlight associated with the at least one object within the FOV.

3. The method of claim 1, further comprising:
    generating, by the one or more processors, the one or more attention pointers as a highlight about an object outside the FOV, wherein the highlight dynamically changes as the object moves into the FOV of the user; and removing, by the one or more processors, the one or more attention pointers once the object outside the FOV moves within the FOV.

4. The method of claim 1, further comprising:

generating, by the one or more processors, a highlighted border for the second virtual screen when the second virtual screen is outside, or outside in part, of the FOV of the user, wherein the highlighted border dynamically changes as the second virtual screen moves into the FOV of the user; and removing, by the one or more processors, the highlighted border once the second virtual screen is within the FOV of the user.

5. The method of claim 1, wherein changing the appearance of the first attention pointer comprises:

re-configuring, by the one or more processors, the appearance of one or more attention pointers for at least one of: a size, a shape, and an image for drawing user attention to an object outside the FOV; and configuring, by the one or more processors, the one or more attention pointers about a border of the second virtual screen when the second virtual screen is within the FOV of the user.

6. The method of claim 1, further comprising:

updating, by the one or more processors, content of at least one of the first virtual screen and the second virtual screen in response to user selection of an update button.

7. The method of claim 1, further comprising:

generating, by the one or more processors, the one or more attention pointers as a highlight of a real object as an object moves from outside to inside the FOV of the user.

8. The method of claim 1, further comprising:

causing, by the one or more processors, at least one attention pointer on the first virtual screen to disappear from the FOV of the user in response to determining that the center of the FOV of the user is within the second virtual screen, wherein the at least one attention pointer is different from the first attention pointer in appearance, and wherein the at least one attention pointer is configured to provide an indication of an update in a content displayed on a third virtual screen different from the first virtual screen and the second virtual screen.

9. A system, comprising:

one or more processors configured to:

display in a display, a first virtual screen, wherein a center of the first virtual screen is located at a center of a field of view (FOV) of a user;

display one or more attention pointers on the first virtual screen within the FOV of the user, wherein a first attention pointer of the one or more attention pointers is configured to provide an indication of an update in a content displayed on a second virtual screen different from the first virtual screen;

change an appearance of the first attention pointer in response to determining that the center of the FOV of the user is moving towards the second virtual screen; and cause the first attention pointer to disappear from the FOV of the user in response to determining that the center of the FOV of the user is within the second virtual screen.

10. The system of claim 9, wherein the one or more processors are further configured to:

identify at least one object within the FOV and at least one object outside the FOV based on the one or more attention pointers and a highlight associated with the at least one object within the FOV.

11. The system of claim 9, wherein the one or more processors are further configured to:

generate the one or more attention pointers as a highlight about an object outside the FOV, wherein the highlight dynamically changes as the object moves into the FOV of the user; and remove the one or more attention pointers once the object outside the FOV moves within the FOV of the user.

12. The system of claim 9, wherein the one or more processors are further configured to:

generate a highlighted border for the second virtual screen when the second virtual screen is outside, or outside in part, of the FOV of the user, wherein the highlighted border dynamically changes as the second virtual screen moves into the FOV of the user; and remove the highlighted border once the virtual screen is within the FOV of the user.

13. The system of claim 9, wherein the one or more processors are further configured to:

re-configure the appearance of the one or more attention pointers for at least one of: a size, a shape, and an image for drawing user attention to an object outside the FOV; and configure the one or more attention pointers about a border of the second virtual screen when the second virtual screen is within the FOV of the user.

14. The system of claim 9, wherein the one or more processors are further configured to:

update content of at least one of the first virtual screen and the second virtual screen in response to user selection of an update button.

15. The system of claim 9, wherein the one or more processors are further configured to:

generate the one or more attention pointers as a highlight of a real object as an object moves from outside to inside the FOV of the user.

16. The system of claim 9, wherein the one or more processors are further configured to:

cause at least one attention pointer on the first virtual screen to disappear from the FOV of the user in response to determining that the center of the FOV of the user is within the second virtual screen, wherein the at least one attention pointer is different from the first attention pointer in appearance, and wherein the at least one attention pointer is configured to provide an indication of an update in a content displayed on a third virtual screen different from the first virtual screen and the second virtual screen.

17. A non-transitory computer-readable medium containing instructions thereon, which when executed by one or more processors performs a method, comprising:

displaying, by one or more processors, in a display, a first virtual screen, wherein a center of the first virtual screen is located at a center of a field of view (FOV) of a user;

displaying, by the one or more processors, one or more attention pointers on the first virtual screen within the FOV of the user, wherein a first attention pointer of the one or more attention pointers is configured to provide an indication of an update in a content displayed on a second virtual screen different from the first virtual screen;

changing, by the one or more processors, an appearance of the first attention pointer in response to determining that the center of the FOV of the user is moving towards the second virtual screen; and causing, by the one or more processors, the first attention pointer to disappear from the FOV of the user in response to determining that the center of the FOV of the user is within the second virtual screen.

18. The non-transitory computer-readable medium of claim 17, wherein the method further comprises:

identifying, by the one or more processors, at least one object within the FOV and at least one object outside the FOV based on the one or more attention pointers and a highlight associated with the at least one object within the FOV.

19. The non-transitory computer-readable medium of claim 17, wherein the method further includes:

generating, by the one or more processors, the one or more attention pointers as a highlight about an object outside the FOV, wherein the highlight dynamically changes as the object moves into the FOV of the user; and removing, by the one or more processors, the one or more attention pointers once the object outside the FOV moves within the FOV.

20. The non-transitory computer-readable medium of claim 17, wherein the method further includes:

causing, by the one or more processors, at least one attention pointer on the first virtual screen to disappear from the FOV of the user in response to determining that the center of the FOV of the user is within the second virtual screen, wherein the at least one attention pointer is different from the first attention pointer in appearance, and wherein the at least one attention pointer is configured to provide an indication of an update in a content displayed on a third virtual screen different from the first virtual screen and the second virtual screen.

* * * * *